April 30, 1963     E. M. KERWIN, JR     3,087,565
APPARATUS FOR DAMPING

Filed April 23, 1957     2 Sheets-Sheet 1

*INVENTOR.*
EDWARD M. KERWIN JR.
BY *Rines and Rines*

3,087,565
APPARATUS FOR DAMPING
Edward M. Kerwin, Jr., Weston, Mass., assignor to Bolt Beranek and Newman Inc., Cambridge, Mass., a corporation of Massachusetts
Filed Apr. 23, 1957, Ser. No. 654,476
11 Claims. (Cl. 181—33)

The present invention relates to apparatus for damping, being more particularly related to damping flexural movements of a surface.

Throughout the years, many proposals have been offered for damping the vibrations of vibratile flexural surfaces such as, for example, the metallic or other bounding surfaces or panels of housings for vibration or noise-producing mechanical, electro-mechanical, rotatable or otherwise moving equipment, or of the bodies or parts of vehicles, such as automotive, railroad and aircraft vehicles and portions thereof. It has been the object of these proposals to eliminate the disturbing or otherwise undesirable effects of the transmission of vibrations or noise through the flexural surfaces. In addition, the fatiguing of metal and other parts can be prevented by limiting flexural movements or vibrations of the same. If the surfaces can be effectively damped, of course, these ends can be achieved.

It has accordingly been proposed, for example, to coat the surfaces with layers of damping material in order to inhibit the vibration thereof. Unfortunately, however, the thickness of damping layers required to produce effective results adds highly undesirable mass or weight, bulk and size to the surfaces, which may be particularly vital factors, for example, in connection with air-borne apparatus and the like. In addition, it is difficult to provide a uniform degree of hardening or curing throughout all parts of a thick applied damping layer, and hence the desired uniform properties throughout the layer. Another proposal has involved the inhibiting or suppressing of the vibratory motion of, for example, a thin panel, by stiffening the same with the aid of a further panel that is flexible in contraction but non-extensible or non-yielding with respect to expansion. Such a proposal, however, has been found to be quite limited in practice since the non-yielding properties of the added panel actually thwart and, indeed, prevent the dissipation of mechanical vibrational energy. Still another suggested solution to this problem, accordingly, has involved covering the flexural surface with a sheet of waffle-like damping material that is secured to or intimately covers the surface only at spaced intervals; and, in some cases, to stiffen the damping material with a stiff felt or thin sheet metal panel and the like. Since the mechanical energy of flexural movement of the surface is directly imparted only to those parts of the damping material that are secured to the surface, such a proposal is even more inefficient than a complete damping-layer covering and, again, is subject to the same disadvantages thereof.

An object of the present invention, accordingly, is to provide a new and improved apparatus for damping the flexural movement of surfaces that shall not be subject to any of the above-described disadvantages of the prior art and that, to the contrary, can provide the highly desirable result of damping equivalent to very thick layers of damping material, but with a much lighter and/or smaller structure. In summary, this result has been attained by employing a relatively thin layer of material extensible and compressible under stress, having a mechanical loss factor greater than that of the flexural surface and an elastic modulus that is represented by a complex function, and providing means disposed between and rigidly attached to the said surface and the layer for mechanically coupling and holding the layer spaced from the said surface.

A further object is to provide a novel damping apparatus of general utility.

Other and further objects will be explained hereinafter and will be more particularly pointed out in the appended claims.

The invention will now be described in connection with the accompanying drawing, FIG. 1 of which is a fragmentary perspective view, partly broken away, illustrating the flexural movement of damping apparatus constructed in accordance with a preferred embodiment of the present invention;

Figure 1:
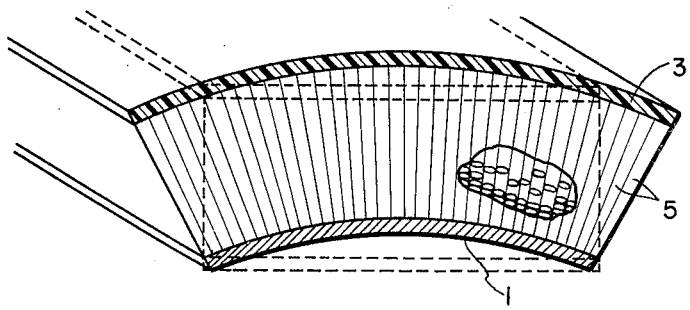

In FIG. 1, a surface member 1, representing, for example, a bounding surface of a machinery housing, or a sheet panel or other surface of a vehicle body, or any surface that may be subjected to flexural movements, is shown in solid lines at the instant of upward flexing and in dotted lines in its normal unflexed condition. Associated with the surface 1 is a damping layer 3 that is mechanically coupled to the surface 1, as later described, so that it is caused to flex therewith. The term "layer," as used in the specification and claims, is intended to connote not only a single slab of material but, also, multiple slabs or composite damping-material structures. Had the damping layer 3 been directly applied as a coating or as a covering to the surface 1 or parts thereof, as before explained, it would have to be of relatively thick proportions to be an effective damping expedient. The layer 3 would, in FIG. 1, for example, have to extend all the way down to the surface 1. This, as before explained, raises not only the problems of providing uniform hardening or other uniform properties over all parts of the thick layer, but, also, the problem of the appreciable mass or weight, bulk and size of the damping treatment. It has been discovered, however, that, provided the layer material 3 is of a particular nature, having certain critical properties for the purposes herein, the outermost portion of such a thick layer contributes the principal damping action to the effective exclusion of the remaining portions of the layer between the outermost portion and the surface 1. Those remaining portions of the thick layer between its outermost portion and the surface 1, however, do contribute the principal undesirable mass or weight, bulk and size.

In accordance with the present invention, therefore, those remaining portions between the outermost portion of such a thick layer and the surface 1 are eliminated and are replaced by a light-weight spacer means 5 that holds a relatively thin layer 3, corresponding to the outermost portion only of such a previously described thick layer. The mass or weight of the damping treatment is thus markedly reduced and, if desired, the bulk and size, as well. In addiiton, the problem inherent in providing uniform characteristics throughout a thick layer has been eliminated. Since, as before stated, however, the thin layer 3, corresponding to the outermost portion of a thick layer extending directly from the surface 1, has been found, from the practical point of view, to contribute substantially all of the damping action, the performance is fully equivalent to the desirable damping performance of thick damping layers. By placing the layer 3 farther and farther out from the surface 1, but mechanically coupled thereto, therefore, successively increased damping, equivalent to thicker and thicker layers, can be obtained, but without the mass or weight of such thick layers. Thus, where size is not too important, one can materially improve the damping of a damping layer of a certain thickness, by spacing it away from, though maintaining it mechanically coupled to, the surface 1.

Figure 2:
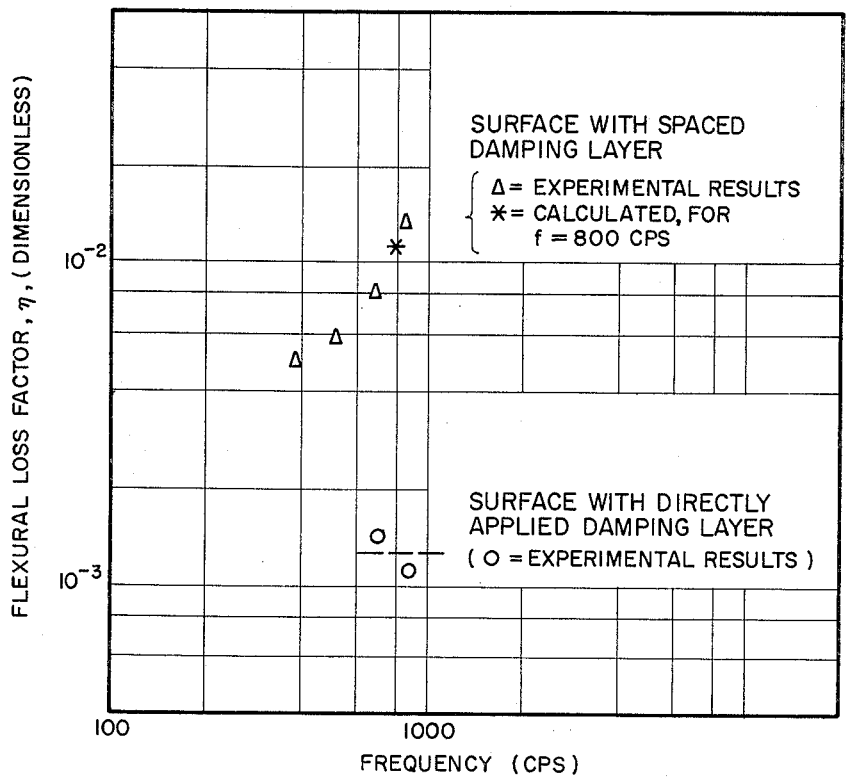
FIG. 2 is a graph illustrating the performance of the apparatus of FIG. 1.

Referring to the experimentally obtained graph of FIG. 2, the flexural or mechanical loss factor $\eta$ (dimensionless) of the composite structure of FIG. 1 is plotted along the ordinate as a function of flexural frequency $f$, plotted along the abscissa in units of cycles per second. The lower curve represents the results obtainable with an eighth of an inch thick damping layer constituted of commercial automobile undercoating compound coated directly upon a one-quarter inch thick cold-drawn steel sheet 1, without the interposed spacer member 5, as taught by the prior art. In, for example, the important 700- to 900-cycle frequency range, the flexural loss factor $\eta$ was found to be of the order of $1.2 \times 10^{-3}$. When, however, an identical sheet 1 was provided with a rigidly cemented "styrofoam" spacer medium 5, slotted to provide greater stiffness in the direction normal to the sheet 1, for reasons later explained, and about a half-inch thick, having the same one-eighth inch damping layer adhere to the top surface thereof, a vastly improved mean flexural loss factor $\eta$ ten times as great was produced; i.e. of the order of $1.1 \times 10^{-2}$ over the said frequency range. A weight approximately one-quarter to one-third the weight of an equivalent thick damping layer, moreover, would thus be achieved.

As previously indicated, the material of the layer 3 must be of a particular nature only to produce the phenomenon of the present invention. First, unlike the before-mentioned prior-art non-extensible stiffening panel, as of such materials as paper or fabric and the like, the applicant's layer 3 must be both compressible and extensible, as more particularly shown in FIG. 1, in order to dissipate the flexural energy. More than this, the material of the layer 3 must have a mechanical or flexural loss factor that is greater than, preferably much larger than, that of the surface 1, or otherwise, the layer 3 will not dissipate the mechanical energy appreciably better than the surface 1 itself. Even this is not enough, however. A substantial mechanical hysteresis effect must be producible in the material for effective losses. The elastic modulus of the material of the layer 3, accordingly, unlike paper, fabric, certain fiber and wood-products, and metals such as steel, aluminum, magnesium, etc., must be a complex mathematical function having a substantial and not a negligible imaginary term as compared with the real part of the function. Under such circumstances only, will the material 3 upon periodic strain, undergo a physical extension or contraction displacement that is not in phase with the force tending to effect the displacement, giving rise to a substantial mechanical hysteresis effect that renders the material 3 mechanically lossy to an adequate degree for the purposes of the present invention. Included in satisfactory materials for the layer 3 are, for example, visco-elastic or plastic compounds such as filled high polymer thermoplastics, later described, and the before-mentioned undercoating compounds, lapped layers of damping tape, appropriately impregnated felt materials, and, where weight is not important, even a metal such as lead, to mention but a few. It has been determined from practical considerations, however, that the flexural loss factor $\eta_2$ of the material of the layer 3 is preferably subject to the following restriction:

$$\eta_2 \geq 0.1 \qquad (1)$$

The stiffness ratio $a$ of the independently controllable elastic modulus $E_2$ of the layer 3 to the elastic modulus $E_1$ of the sheet 1 has been determined preferably to lie within substantially the range $$a = \frac{E_2}{E_1} \to 10^{-5} \text{ to } 5 \times 10^{-1} \qquad (2)$$

There are also serious restrictions upon the nature of the spacing means 5. Like the surface 1 that is to be damped and that has a negligible flexural loss factor, the spacing means 5 preferably also has a negligible flexural loss factor. It must be rigidly attached not only to the surface 1 but, also, to the layer 3, in order to permit of tight mechanical coupling therebetween, whereby the mechanical energy involved in flexural movement of the surface 1 may be conveyed to and dissipated in the expansible and compressible mechanically lossy layer 3. Further to this end, the stiffness of the spacing means 5 is preferably greater in the direction from the surface 1 toward the layer 3, as before mentioned, than in a direction orthogonal thereto. Unless, moreover, the elastic modulus of the spacing means 5 in the direction from the surface 1 to the layer 3 is greater than (and, in the limiting case substantially equal to) that of the layer 3, effective coupling cannot be achieved. For weight or mass considerations, the spacing means 5 should also be light weight. In FIG. 1, accordingly, this spacing means assumes the ilustrative form of light-weight metal, cardboard or other honeycomb-type structures having spaced cells that serve as supports to hold the layer 3 spaced from the surface 1; and, through cementing to the surface 1 and adhesion to the layer 3, provide stiff mechanical coupling between the surface 1 and the layer 3. It may be that, in some cases, the spacer means 5 may contain damping lossy material as where, for example, it is desired to spray the material of the layer 3 upon the upper or free surface of the spacer supports. Other kinds of strut and similar supports may also be used, as may the previously described relatively rigid foam-like plastic material "styrofoam" and the like, to mention but a few other possibilities. There are, indeed, some substances, such as polyurethane, which can, by different treatment, serve either as an expansible and compressible lossy material or as a rigid foam-type spacing means. By providing an outer layer 3 of lossy properties and an inner region 5 of rigid properties, a unitary structure 3—5 can be provided. Other expedients, such as providing projections in the surface 1 that serve as spacers 5, either by scoring, heavy sand-blasting or otherwise removing material of the surface 1, or, alternatively, adding spacer projections thereto, and then applying the material 3 of the layer, may also be employed. In all cases, the spacing means 5 holds the outer layer 3 substantially parallel to, or at fixed spacing with respect to, the surface 1. The spacer means 5, moreover, may also simultaneously serve heat-insulating functions as when, for example, it is formed of the before-mentioned "styrofoam" and the like.

There are, also, limitations on the relative dimensions of the surface 1, the spacing means 5 and the layer 3 to attain the useful results of the present invention. In the case of the damping layer 3, its thinnest limit is determined by the smallest feasible layer, whereas the thinnest limit of the spacer 5 is determined by the fact that there is negligible benefit in spacing the layer 3 very close to the surface 1, except, perhaps, in some fatigue-elimination applications. The maximum spacer thickness, on the other hand, is determined by the practical consideration of how much of a protrusion from the surface is tolerable or feasible, while the maximum layer thickness is limited by such factors as mass or weight and the obtaining of uniform characteristics throughout the layer. Experimentation and analysis have demonstrated that, to produce the results of the present invention to a practical degree, the ratio $\xi$ of the thickness of the layer 3, $h_2$, to the thickness of the sheet 1, $h_1$, lies substantially within the range $$\xi = \frac{h_2}{h_1} \to 0.03 \text{ to } 30 \qquad (3)$$

and the ratio $\alpha$ of the thickness, width or spacing of the spacing means 5, $h_3$, to the thickness of the sheet 1, $h_1$, lies substantially within the range $$\alpha = \frac{h_3}{h_1} \to 0.3\text{--}30 \qquad (4)$$

As a further illustration, in the case of applications where dimensions and weight are limited, such as, for example, vehicular installations including aircraft, missiles, vessels and torpedoes, to mention but a few, having steel or aluminum walls and the like, it has been determined to be preferable to employ damping material 3 of the filled high polymer type, described by Oberst et al. in Akustische Beihefte (1954), Heft 1, AB 437–488, and presently marketed under the trademark "Aquaplas" by H. L. Blackford Company, Newark, New Jersey, and the following constant limitations:

$$\eta_2 = 0.1 \to 0.5 \qquad (5)$$

$$a = \frac{E_2}{E_1} = 3 \times 10^{-3} \to 5 \times 10^{-1} \qquad (6)$$

$$\xi = \frac{h_2}{h_1} = 0.05 \to 3 \qquad (7)$$

and $$\alpha = \frac{h_3}{h_1} = 0.5 \to 20 \qquad (8)$$

Figure 6:
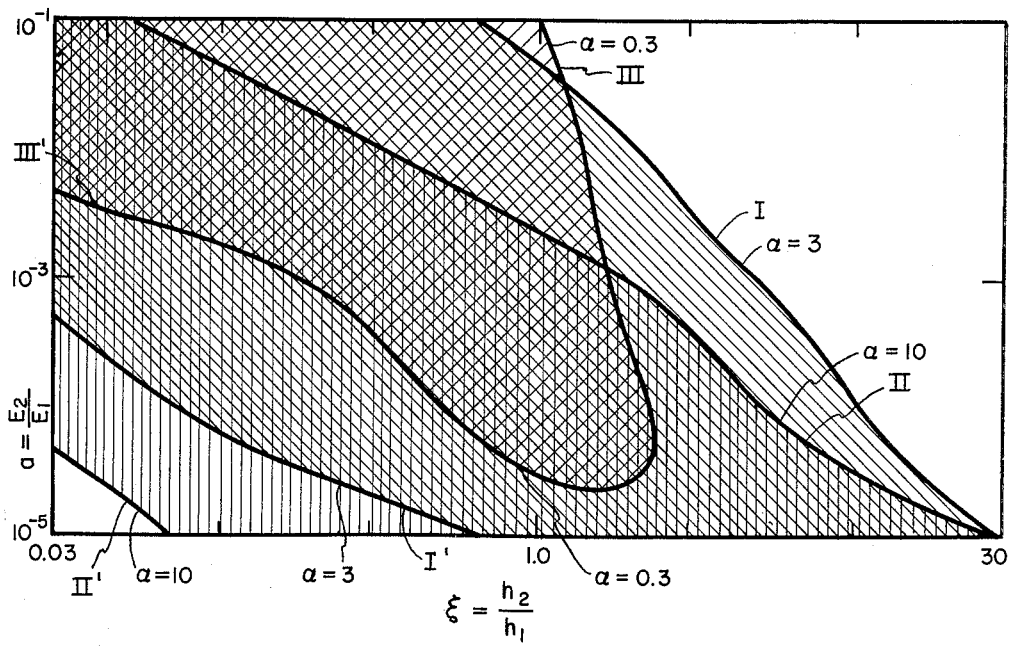
FIG. 6 is a further graph delineating optimum design regions underlying the present invention.

FIG. 6 is a graph illustrating the curves representing the boundaries of the above-described preferred operating regions, plotted upon a two-dimensional coordinate system constituted of an ordinate, representing the modulus ratio $a$, and an abscissa representing the layer-to-surface thickness ratio $\xi$. The region between the upper curve I and the next-to-the-left-most curve I′ represents the optimum design region for $\alpha = 3$. To the right of the curve I, a region of over-design exists where the point of diminishing marginal return for increased layer thickness or surface-to-layer spacing is reached; i.e. inappreciable additional damping is obtained for greater layer thicknesses or spacings. To the left of the curve I′ on the other hand, for $\alpha = 3$, insignificant damping is obtainable. Similarly designated in FIG. 6 are the respective optimum design regions between curves II and II′ for $\alpha = 10$, and between curves III and III′ for $\alpha = 0.3$. These curves were obtained from a theoretical analysis, experimentally verified as in FIG. 2, which demonstrates the following approximate relationship between the previously defined variables involved in the structures of the invention:

$$\frac{\eta}{\eta_2} = \frac{a\xi\{(3+12\alpha+12\alpha^2)+\xi(6+12\alpha)+4\xi^2+2a\xi^3+a^2\xi^4\}}{\left[\begin{array}{l}1+a\xi(5+12\alpha+12\alpha^2)+a\xi^2[6+4a+\alpha(12+12a)\\+\alpha^2(12a)]+a\xi^3[4+6a+\alpha(12a)]+5a^2\xi^4+a^3\xi^5\end{array}\right]} \qquad (9)$$

Figure 3:
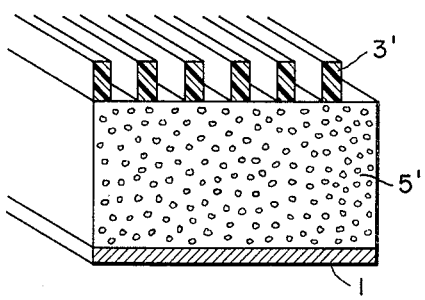
FIGS. 3 and 4 and 5 are views similar to FIG. 1 of modifications.
Figure 4:
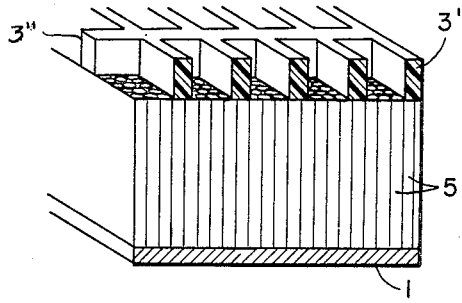
Figure 5:
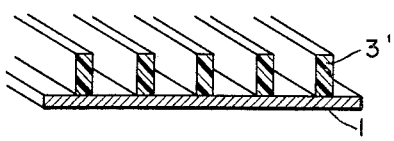

Since, moreover, as before discussed, a layer farther removed from the surface 1 provides greater damping, one can obtain damping performance equivalent to a continuous layer 3 through the employment of slightly thicker spaced layer segments, if desired. This obviates the necessity for a continuous covering. In FIG. 3, accordingly, a plurality of substantially parallel spaced layer-strip or rib segments 3′ are provided, shown in this case, supported by the before-described rigid foam-material 5′, and producing uni-axial damping. This, indeed, may be useful even in the case of direct attachment of the layer to the surface 1, as in FIG. 5. In FIG. 4, on the other hand, bi-axial damping is obtained by substantially orthoganally intersecting sets or grids of layer-strip segments 3′ and 3″. The spacer 5 may also be in grid form, if desired. Omni-directional effects could, if desired, be obtained with sets of layer segments that intersected to form equilateral triangles, not shown.

It is to be understood that the invention is applicable with any kind of flexural surface 1 and not merely the sheet metal or other panels or surfaces above described. As another example, glass and other light-transmitting surfaces are also subject to flexural vibrational movements. If, in FIG. 1, the surface 1 is a light-transmitting surface (i.e. transparent or translucent to any degree) it is preferable that the layer 3 and the spacer means 5 be light-transmitting, also. In the case of a glass surface 1, for example, the spacer means 5 may comprise light-transmitting Plexiglas spacers and the layer 3 may be light-transmitting visco-elastic adhesive, such as that used in safety glass, or visco-elastic polyethylene.

Further modifications will occur to those skilled in the art and all such are considered to fall within the spirit and scope of the invention as defined in the appended claims.

What is claimed is:

1. In combination with a surface subject to flexural movements to be damped, a thin damping layer of mechanically extensible and contractable visco-elastic material arranged generally parallel to said surface, and a mechanically stiff spacer much thicker than said layer arranged between and firmly secured to said layer and said surface for coupling vibrations of said surface to said damping layer to cause said damping layer to extend and contract, said damping layer being free of constraint except for that provided by said spacer, said damping layer having a mechanical loss factor greater than that of said surface and having a complex elastic modulus, the extensional stiffness of said spacer being substantially greater in a direction normal to said surface than in a direction parallel thereto, the shear stiffness of said spacer being substantially greater than that of said damping layer, whereby the mechanical energy losses in said damping layer are substantially greater than obtained in the absence of said stiff spacer.

2. The invention of claim 1, said spacer comprising a plurality of spaced supports.

3. The invention of claim 1, said spacer comprising a honeycomb structure.

4. The invention of claim 1, said spacer comprising foam material.

5. The invention of claim 1, said damping layer comprising substantially parallel spaced strip elements.

6. The invention of claim 1, said damping layer comprising a plurality of sets of intersecting spaced strip segments.

7. The invention of claim 1, said damping layer comprising a high polymer thermoplastic material.

8. The invention of claim 1, said spacer being lighter in weight than would be said damping layer of the same thickness.

9. The invention of claim 1, the mechanical loss factor of said damping layer being equal to or greater than 0.1, the elastic modulus of said damping layer having a value within the range of from substantially one-half to substantially one one-hundred-thousandth of the elastic modulus of said surface.

10.. The invention of claim 1, said damping layer comprising a high polymer thermoplastic material, the mechanical loss factor of said damping layer having a value within the range of from substantially 0.1 to substantially 0.5, the elastic modulus of said damping layer having a value within the range of from substantially 0.5 to substantially .003 of the elastic modulus of said surface, the thickness of said damping layer having a value within the range of from substantially .05 to substantially 3 times the thickness of said surface, the thickness of said spacer having a value within the range of from substantially 0.5 to substantially 20 times the thickness of said surface.

11. The invention of claim 1, said surface, said damping layer, and said spacer being of light-transmitting material.

References Cited in the file of this patent

UNITED STATES PATENTS

| | | |
|---|---|---|
| 1,848,190 | Morgan | Mar. 8, 1932 |
| 2,069,413 | Leadbetter | Feb. 2, 1937 |
| 2,184,482 | Austin et al. | Dec. 26, 1939 |
| 2,442,347 | Eklund | June 1, 1948 |
| 2,477,852 | Bacon | Aug. 2, 1949 |
| 2,534,137 | Lewis | Dec. 12, 1950 |
| 2,551,087 | Barnhart | May 1, 1951 |
| 2,728,702 | Simon et al. | Dec. 27, 1955 |
| 2,744,042 | Pace | May 1, 1956 |
| 2,785,286 | Lichtgarn | Mar. 12, 1957 |
| 2,819,032 | Detrie et al. | Jan. 7, 1958 |

FOREIGN PATENTS

| | | |
|---|---|---|
| 862,206 | France | Mar. 1, 1941 |